(12) United States Patent
Asaba et al.

(10) Patent No.: US 10,277,846 B2
(45) Date of Patent: Apr. 30, 2019

(54) PHOTOELECTRIC CONVERSION ELEMENT, IMAGE READING DEVICE, IMAGE FORMING APPARATUS, AND SIGNAL CONTROL METHOD

(71) Applicants: Naoki Asaba, Kanagawa (JP);
Masamoto Nakazawa, Kanagawa (JP)

(72) Inventors: Naoki Asaba, Kanagawa (JP);
Masamoto Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 350 days.

(21) Appl. No.: 14/745,967

(22) Filed: Jun. 22, 2015

(65) Prior Publication Data
US 2016/0006961 A1    Jan. 7, 2016

(30) Foreign Application Priority Data

Jul. 4, 2014 (JP) ................. 2014-139083

(51) Int. Cl.
| | | |
|---|---|---|
| *H04N 1/04* | (2006.01) | |
| *H04N 5/369* | (2011.01) | |
| *H04N 5/357* | (2011.01) | |
| *H04N 5/374* | (2011.01) | |
| *H04N 5/378* | (2011.01) | |
| *H04N 1/028* | (2006.01) | |

(52) U.S. Cl.
CPC ......... *H04N 5/3692* (2013.01); *H04N 5/3575* (2013.01); *H04N 5/374* (2013.01); *H04N 5/378* (2013.01); *H04N 1/028* (2013.01)

(58) Field of Classification Search
CPC .... H04N 5/3692; H04N 5/3575; H04N 5/374; H04N 5/378; H04N 1/028

USPC ....... 358/483, 482, 512–514; 250/208.1, 216
See application file for complete search history.

(56) References Cited

U.S. PATENT DOCUMENTS

| | | | |
|---|---|---|---|
| 9,267,840 B2 * | 2/2016 | Kato ................. | H04N 5/235 |
| 2010/0182652 A1 * | 7/2010 | Tanaka ............... | H04N 1/401 |
| | | | 358/461 |
| 2011/0019039 A1 | 1/2011 | Ikuma et al. | |

(Continued)

FOREIGN PATENT DOCUMENTS

| | | |
|---|---|---|
| JP | 9-247538 A | 9/1997 |
| JP | 2003-250092 | 9/2003 |

(Continued)

OTHER PUBLICATIONS

Japanese Office Action dated Apr. 24, 2018 in Japanese Application No. 2014-139083, with English translation, 12 pages.

(Continued)

*Primary Examiner* — Cheukfan Lee
(74) *Attorney, Agent, or Firm* — Oblon, McClelland, Maier & Neustadt, L.L.P.

(57) ABSTRACT

A photoelectric conversion element comprises: a plurality of pixels, each of which performs photoelectric conversion and outputs an analog signal; an analog processing unit that sequentially processes, on a pixel-to-pixel basis, the analog signals output from a pixel group including the pixels; and a signal supply unit that supplies a signal needed for preliminary operation to the analog processing unit so as to enable the analog processing unit to perform the preliminary operation before the analog processing unit starts to process the analog signals output from the pixel group.

12 Claims, 10 Drawing Sheets

(56) References Cited

U.S. PATENT DOCUMENTS

| | | | | |
|---|---|---|---|---|
| 2012/0127356 A1* | 5/2012 | Matsuura | ............... | H04N 5/378 |
| | | | | 348/313 |
| 2013/0329265 A1* | 12/2013 | Miyamoto | ............. | H04N 1/121 |
| | | | | 358/496 |
| 2016/0118978 A1* | 4/2016 | Ahn | ..................... | H03K 17/165 |
| | | | | 348/308 |
| 2016/0301886 A1* | 10/2016 | Muto | ..................... | H04N 5/378 |

FOREIGN PATENT DOCUMENTS

| JP | 2005-94338 | 4/2005 |
|---|---|---|
| JP | 2006-229843 | 8/2006 |
| JP | 2006-311374 A | 11/2006 |
| JP | 2011-029793 | 2/2011 |
| JP | 2013-30999 A | 2/2013 |

OTHER PUBLICATIONS

Office Action dated Sep. 4, 2018 in Japanese Patent Application No. 2014-139083, (with English translation), 14 pages.

\* cited by examiner

PHOTOELECTRIC CONVERSION ELEMENT, IMAGE READING DEVICE, IMAGE FORMING APPARATUS, AND SIGNAL CONTROL METHOD

CROSS-REFERENCE TO RELATED APPLICATIONS

The present application claims priority to and incorporates by reference the entire contents of Japanese Patent Application No. 2014-139083 filed in Japan on Jul. 4, 2014.

BACKGROUND OF THE INVENTION

1. Field of the Invention

The present invention relates to a photoelectric conversion element, an image reading device, an image forming apparatus, and a signal control method.

2. Description of the Related Art

An image reading device, such as a scanner, performs photoelectric conversion on light reflected by a document, and performs processes, such as amplification or an analog-to-digital (A/D) conversion, on an analog image signal obtained through the photoelectric conversion. Conventionally, a charge coupled device (CCD) has been mainly used as a photoelectric conversion element. However, with a recent demand for lower electric power, a complicated metal-oxide semiconductor (CMOS) linear sensor has attracted attention. The CMOS linear sensor is the same as the CCD in that it uses a photodiode (PD) to perform photoelectric conversion on incident light, but differs in that it performs a charge-voltage conversion in the vicinity of a pixel and outputs a voltage to a subsequent stage whereas the CCD first transfers electric charges by using a shift register and thereafter performs a charge-voltage conversion by an electric-charge detecting unit. Further, the CMOS linear sensor can be manufactured by a CMOS process, so that the CMOS linear sensor may include a built-in logic circuit, a built-in programmable gain amplifier (PGA), and a built-in A/D converter (ADC).

Furthermore, in recent years, a column system for increasing a driving speed has been known, in which a plurality of pixels (for example, three pixels of red, green, and blue) are treated as a single pixel group (column), analog processing circuits, such as a PGA and an ADC, are provided for each column to enable parallel processing, and each of the analog processing circuits sequentially performs analog processing on analog image signals read from the plurality of the pixels in the column (for example, in order of red, green, and blue).

Moreover, Japanese Laid-open Patent Publication No. 2011-029793 discloses a solid state imaging device, which includes a line (column) of unit pixels and includes a noise correction circuit that corrects, for each row, a detected pixel signal by using a noise component.

However, in the conventional CMOS linear sensor of the column system, the operating state immediately before processing varies between the first pixel (for example, a red pixel) that is first subjected to analog signal processing in a column and other subsequent pixels (for example, green and blue pixels), so that a characteristic difference occurs between the pixels (between colors) resulting in deterioration of image quality (coloring or false color).

Further, power, a ground voltage GND, and a reference voltage are supplied to the PGA and the ADC, and load fluctuation or a switching noise occurs in the PGA and the ADC when operation is performed. In this case, the operating state immediately before processing varies between the first pixel and the other subsequent pixels, so that the load fluctuation or the switching noise varies, resulting in a gain error between the pixels (between the colors) in the PGA and a conversion error between the pixels (between the colors) in the ADC. If there is linearity in the characteristic difference, it may be relatively easy to correct an image signal at a subsequent stage and a problem may not occur. However, it is difficult to correct complex characteristics, such as a characteristic difference that varies depending on pixel signal levels or the columns, at a subsequent stage. Therefore, the image quality may be deteriorated (the characteristic is not uniform between the colors and coloring or false color occurs), or a chip size or cost may increase by providing a dedicated correction circuit.

In view of the above circumstances, there is a need to provide a photoelectric conversion element, an image reading device, an image forming apparatus, and a signal control method capable of easily preventing deterioration in the image quality due to an analog processing unit that sequentially processes, for each of pixels, analog signals output from a pixel group including the pixels, without providing a dedicated correction circuit or the like.

SUMMARY OF THE INVENTION

It is an object of the present invention to at least partially solve the problems in the conventional technology.

According to the present invention, there is provided a photoelectric conversion element comprising: a plurality of pixels, each of which performs photoelectric conversion and outputs an analog signal; an analog processing unit that sequentially processes, on a pixel-to-pixel basis, the analog signals output from a pixel group including the pixels; and a signal supply unit that supplies a signal needed for preliminary operation to the analog processing unit so as to enable the analog processing unit to perform the preliminary operation before the analog processing unit starts to process the analog signals output from the pixel group.

The present invention also provides an image reading device comprising the above-described photoelectric conversion element.

The present invention also provides an image forming apparatus comprising: the above-described image reading device; and an image forming unit that forms an image based on image data read by the image reading device.

The present invention also provides a signal control method comprising: supplying, to an analog processing unit that sequentially processes analog signals output from a pixel group including a plurality of pixels that perform photoelectric conversion, a signal needed for preliminary operation so as to enable the analog processing unit to perform the preliminary operation; causing the analog processing unit to perform the preliminary operation by using the signal needed for the preliminary operation; and causing the analog processing unit to perform the preliminary operation and thereafter sequentially process, on a pixel-to-pixel basis, the analog signals output from the pixel group.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
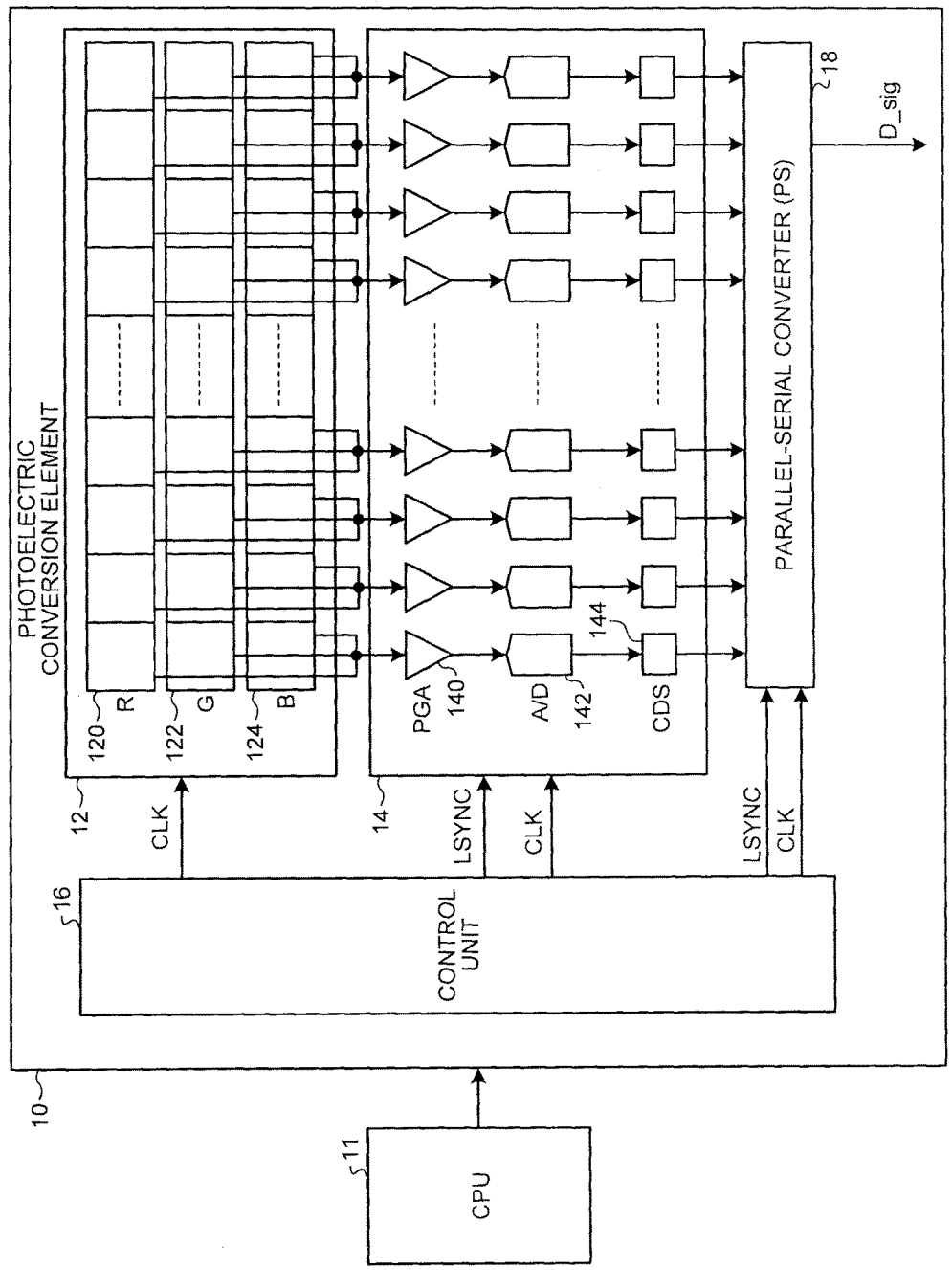
FIG. 1 is a diagram illustrating a photoelectric conversion element and the periphery thereof according to an embodiment of the present invention.

Exemplary embodiments of a photoelectric conversion element according to the present invention will be described below with reference to the accompanying drawings. FIG. 1 is a diagram illustrating a photoelectric conversion element 10 and the periphery thereof according to an embodiment. The photoelectric conversion element 10 is, for example, a complementary metal-oxide semiconductor (CMOS) linear sensor that includes a photoelectric converter 12, a signal processing unit 14, a control unit (timing control unit) 16, and a parallel-serial converter (PS) 18, and operates under the control of a central processing unit (CPU) 11.

The photoelectric converter 12 incldes n pixels (including photodiodes) 120, n pixels (including photodiodes) 122, and n pixels (including photodiodes) 124, which are arrayed in one direction for the respective colors of red (R), green (G), and blue (B). The photoelectric conversion element 10 is configured such that the pixels 120, 122, and 124 that receive light of the three respective colors of R, G, and B form a single column (pixel group), and a signal obtained through photoelectric conversion is output for each column. Each of the pixels 120, 122, and 124 performs the photoelectric conversion on light reflected by a document, and outputs an analog image signal of each pixel.

The signal processing unit 14 includes n programmable gain amplifiers (PGAs) (amplifying units) 140, n analog-to-digital converters (ADCs) 142, and n correlated double sampling (CDS) units (digital CDSs (D-CDSs)) 144, and is configured to amplify analog signals output by the photoelectric converter 12 for each of the columns to convert the analog signals to digital signals, corrects the signals by CDS, and outputs the corrected signals.

The PGA 140 is provided for each of the columns, and amplifies analog image signals in accordance with the dynamic range of the A/D converter 142. The A/D converter 142 converts the analog signals output by the PGA 140 into digital signals, and outputs the digital signals to the CDS unit 144. Hereinafter, the PGA 140 and the A/D converter 142 that sequentially process, on a pixel-to-pixel basis, the analog signals output by a pixel group may be referred to as an analog processing unit. The analog processing unit performs preliminary operation to be described later, and thereafter sequentially processes, on a pixel-to-pixel basis, the analog signals output by the pixel group.

The CDS unit 144 performs a CDS process of calculating and outputting a difference between a reset level of the photoelectric converter 12 (a reference level that is output independently of light), which is indicated by the digital signals input from the A/D converter 142 and a signal level stored in each of the pixels (the pixels 120, 122, and 124). The parallel-serial converter 18 serializes the digital signals that are processed and output in parallel by a plurality of the columns, and outputs the signals to a subsequent stage. The control unit 16 generates and outputs various signals needed to drive each of the units of the photoelectric conversion element 10. Further, the control unit 16 controls an operation timing such that, for example, the photoelectric conversion element 10 performs collective exposure.

Incidentally, while the CMOS linear sensor having a column structure to process a plurality of signals in parallel is illustrated in the example in FIG. 1, the processing system may be one system. Further, while a one-column-with-three-pixel structure including the single PGA 140, the single A/D converter 142, and the single CDS unit 144 for three pixels of R, G, and B is illustrated as an example, the structure is not limited to this example. A one-column-with-six-pixel structure including odd pixels and even pixels of R, G, and B may be employed. Furthermore, while an example is illustrated in which the photoelectric conversion element 10 is configured to perform CDS on digital data obtained by A/D conversion, it may be possible to perform correlated double sampling for each pixel by using an analog signal at the reset level amplified by the PGA 140 and by using an analog signal at the signal level.

Figure 2:
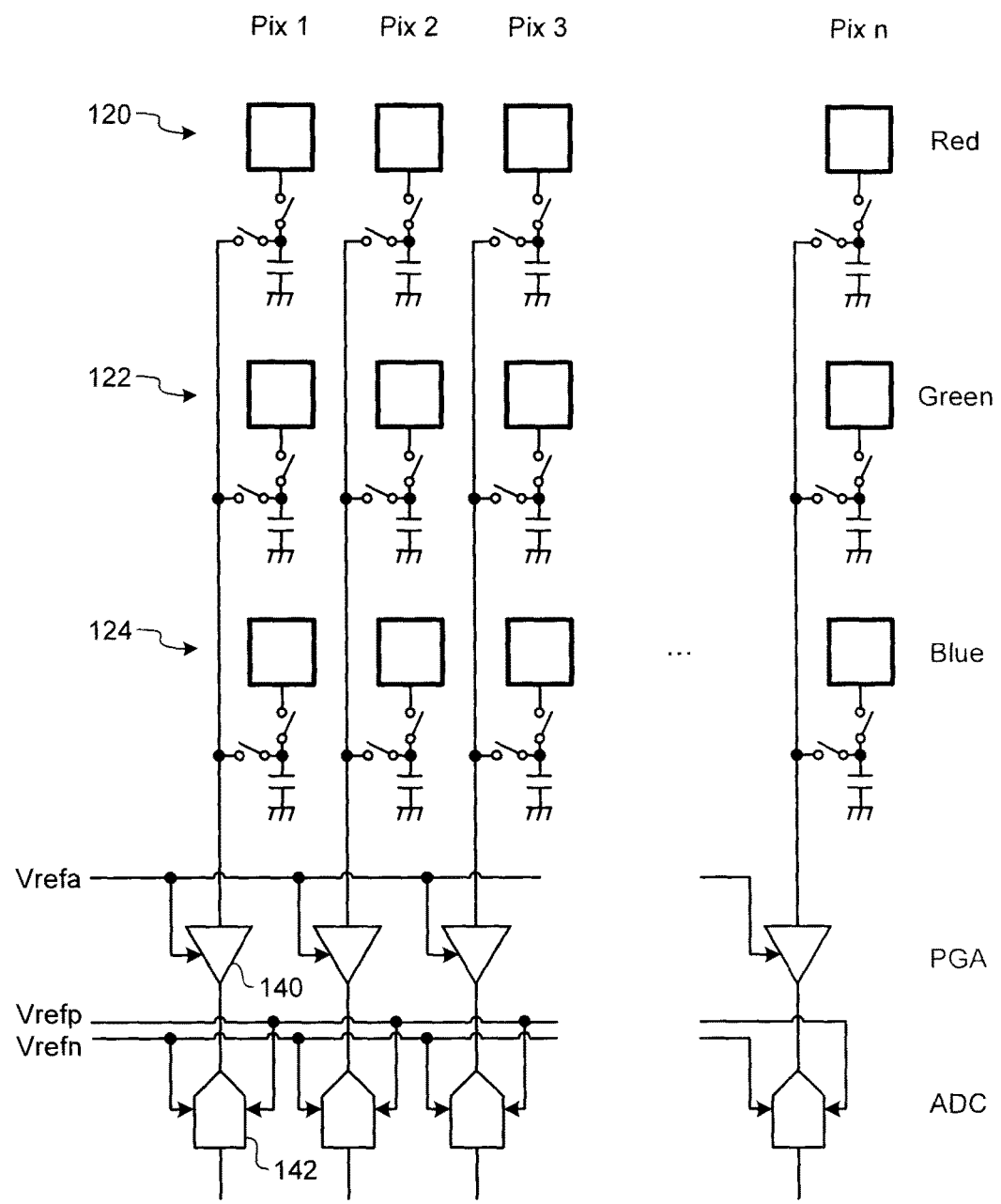
FIG. 2 is a detailed diagram illustrating a photoelectric converter and an analog processing unit in the photoelectric conversion element.

FIG. 2 is a detailed diagram illustrating the photoelectric converter 12 and the analog processing unit (the PGA 140 and the A/D converter 142) of the photoelectric conversion element 10. As illustrated in FIG. 2, the photoelectric conversion element 10 is configured such that n pixels are arrayed in the main-scanning direction, and three lines for a plurality of colors of red, green, and blue are arrayed in the sub-scanning direction. In this example, control signal lines and the like are omitted for the sake of simplicity.

In the photoelectric conversion element 10, all of the pixels accumulate electric charges in a common exposure time, convert the electric charges to voltages, and store pixel signals in analog memories (capacitors) via switching elements. A plurality of pixels (three pixels of red, green, and blue) constitute a single column, and are connected to the shared PGA 140 via the switching elements. Signals read from the pixels are input to the PGA 140 in order of red, green, and blue in a time-sharing manner. The signals input to the PGA 140 are amplified with reference to a reference voltage Vrefa, and at a subsequent stage, converted to digital signals with reference to an upper reference voltage Vrefp and a lower reference voltage Vrefn by the A/D converter 142 that is provided for each column in the same manner as the PGA 140.

Figure 3A:
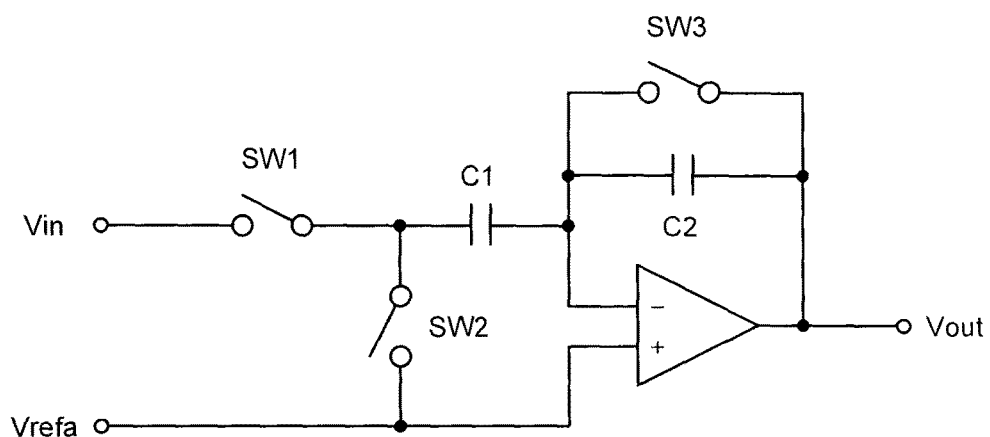
FIGS. 3A to 3C are detailed diagrams illustrating a PGA.
Figure 3B:
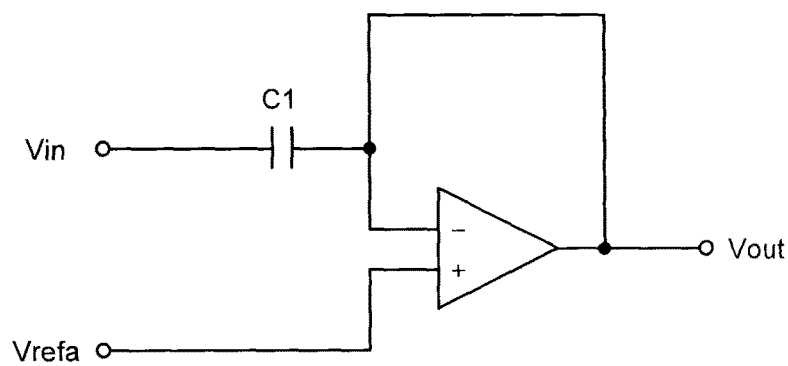
Figure 3C:
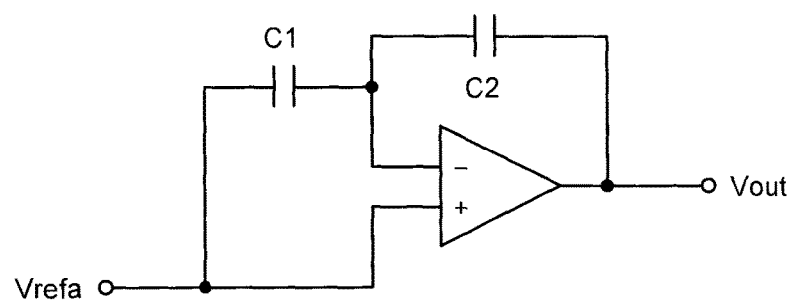

FIGS. 3A to 3C are detailed diagrams illustrating the PGA 140. In a metal-oxide semiconductor (MOS) integrated circuit, such as a CMOS sensor, it is difficult to configure a high-precision resistor; therefore, a switched capacitor circuit that performs operation equivalent to the resistor by switching connection of a capacitor by switches using MOS-field effect transistors (FET) is often used.

FIG. 3A illustrates a basic configuration of the PGA 140. As illustrated in FIG. 3A, the PGA 140 includes an operational amplifier, two capacitors, and three switches. The PGA 140, in which an input voltage Vin is a pixel signal and the reference voltage Vrefa is a reference voltage for amplification, amplifies a difference between the voltages Vin and Vrefa by a capacity ratio of the capacitors, and outputs an output voltage Vout. In this example, a power supply of the operational amplifier, control signal lines of the switches, and the like are omitted for the sake of simplicity.

Amplification operation performed by the PGA 140 will be described in detail below with reference to FIGS. 3B and 3C. First, in the PGA 140, switches SW1 and SW3 are turned on and a switch SW2 is turned off. An equivalent circuit of the PGA 140 at this time is illustrated in FIG. 3B. Because of the imaginary short of the operational amplifier, a voltage at the right end of a capacitor C1 is the voltage Vrefa, so that a voltage applied to each end of the capacitor C1 becomes a voltage Vin−Vrefa. An electric charge to be charged is C1×(Vin−Vrefa). Meanwhile, a voltage applied to each end of a capacitor C2 (not illustrated) is zero, so that an electric charge is also zero.

Subsequently, in the PGA 140, the switches SW1 and SW3 are turned off and the switch SW2 is turned on. An equivalent circuit of the PGA 140 at this time is illustrated in FIG. 3C. A voltage at the left end of the capacitor C1 is the voltage Vrefa, so that a voltage applied to each end of the capacitor C1 becomes zero. Therefore, the electric charge C1×(Vin−Vrefa) stored in the capacitor C1 is discharged. The input impedance of the operational amplifier can be approximated to infinity, so that the electric charge discharged from the capacitor C1 is charged to the capacitor C2 connected to the capacitor C1 in series. Because of the imaginary short of the operational amplifier, a voltage at the left end of the capacitor C2 is the voltage Vrefa, so that the electric charge in the capacitor C2 is C2×(Vout−Vrefa). The electric charge C1×(Vin−Vrefa) discharged from the capacitor C1 and the electric charge C2×(Vout−Vrefa) charged to the capacitor C2 are equal to each other, so that the output voltage becomes Vout=C1/C2×(Vin−Vrefa)+Vrefa. Namely, a difference between the pixel signal Vin and the reference voltage Vrefa is amplified by the capacity ratio of C1/C2, an offset Vrefa is added, and then a result is output.

Incidentally, if the voltage Vrefa varies due to load fluctuation or a switching noise, a gain of the PGA 140 varies. In particular, when variation in the voltage Vrefa differs between pixels (between colors), and if there is linearity in the difference, it may be relatively easy to correct an image signal at a subsequent stage and a problem may not occur. However, if a pixel signal level varies, an electric current supplied from Vrefa to the capacitor varies, load fluctuation varies, and a characteristic difference varies depending on the columns, resulting in complex characteristics, which is difficult to correct at a subsequent stage. Therefore, it is important to reduce a characteristic difference in the voltage Vrefa between the pixels (between the colors) as much as possible.

The A/D converter 142 can be configured with an operational amplifier and a switched capacitor circuit similarly to the PGA, and is influenced by load fluctuation and a switching noise in the same manner as described above. Variation in the upper reference voltage Vrefp and the lower reference voltage Vrefn of the A/D converter 142 directly results in a conversion error. Therefore, it is important to reduce a characteristic difference in the voltages Vrefp and Vrefn between the pixels (between the colors) as much as possible because this characteristic difference is difficult to correct at a subsequent stage, similarly to the PGA 140.

Figure 4:
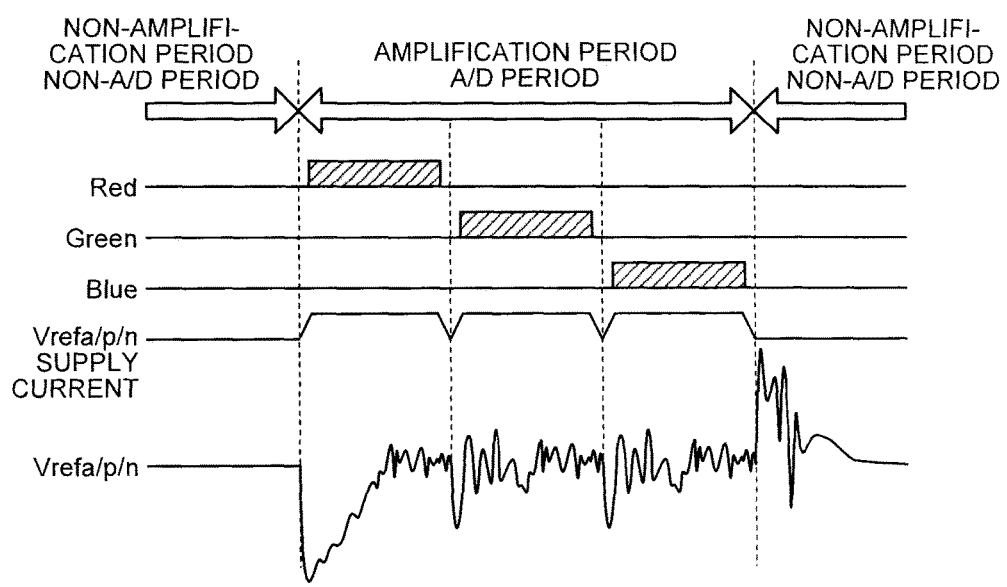
FIG. 4 is a diagram illustrating first operation performed by the photoelectric conversion element.

FIG. 4 is a diagram illustrating first operation performed by the photoelectric conversion element 10. In FIG. 4, an operation timing of the analog processing unit (the PGA 140 and the A/D converter 142) for one column is illustrated. Vrefa/p/n collectively indicates the reference voltage Vrefa of the PGA 140 and the upper and lower reference voltages Vrefp and Vrefn of the A/D converter 142 as described above.

In the photoelectric conversion element 10, pixel signals output from the pixels are sequentially input to the PGA 140. The photoelectric conversion element 10 is configured such that three pixels of R, G, and B constitute one column as described above, and sequentially performs processes in order of R, G, and B. The PGA 140 stops operation during a non-amplification period, and starts operation upon start of an amplification period. When the PGA 140 starts operation, an electric current supplied from the voltage Vrefa rapidly increases, and a voltage drop of the voltage Vrefa occurs as load fluctuation. This means that a gain of the PGA 140 varies.

Namely, when performing the first operation as illustrated in FIG. 4, the photoelectric conversion element 10 is greatly influenced by a reduction in the voltage Vrefa because an electric current starts to flow rapidly for a red image signal that is firstly input to the PGA 140, but is less influenced for subsequent green and blue image signals. Therefore, a characteristic difference occurs between the colors, resulting in deterioration of image quality.

Further, in the first operation of the photoelectric conversion element 10, a switching noise that occurs due to switching operation of the switches illustrated in FIGS. 3A to 3C causes variation in the voltage Vrefa. Specifically, a switching noise that occurs when the red image signal is amplified and subjected to A/D conversion causes the voltage Vrefa to vary, and the influence continues until a timing of amplification and A/D conversion of the subsequent green image signal. Similarly, a switching noise that occurs, when the green image signal is amplified and subjected to A/D conversion, causes the voltage Vrefa to vary until a timing of amplification and A/D conversion of the subsequent blue image signal.

However, when the first red image signal is amplified and subjected to A/D conversion, a switching noise has not occurred at the timing of the previous stage, so that an influence of the switching noise is relatively small. Small variation in the voltage Vrefa due to the switching noise is desirable, but this causes a difference in the variation in the voltage Vrefa between red and the other colors as a characteristic difference between the colors, resulting in deterioration of image quality.

Figure 5:
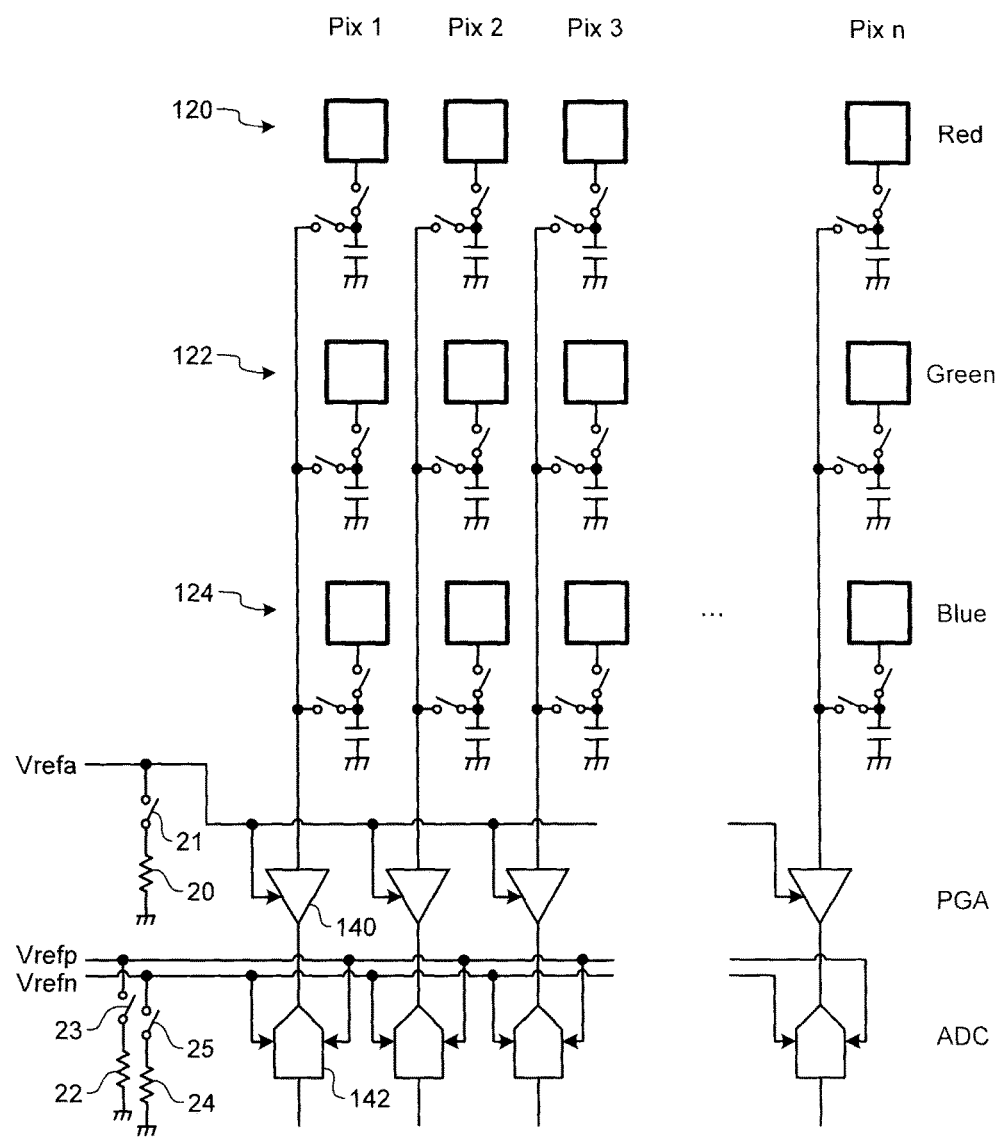
FIG. 5 is a detailed diagram illustrating a photoelectric converter, an analog processing unit, and the periphery of a photoelectric conversion element according to a first modification of the embodiment.

FIG. 5 is a detailed diagram illustrating the photoelectric converter 12, the analog processing unit (the PGA 140 and the A/D converter 142), and the periphery of the photoelectric conversion element 10 according to a first modification. The photoelectric conversion element 10 of the first modification is configured such that a dummy load resistance 20 (Rdmya) is connected between the voltage Vrefa and a ground voltage GND via a switch 21. A resistance value Rdmya of the dummy load resistance is set such that an electric current supplied from the voltage Vrefa to all of the PGAs 140 and an electric current flowing through the dummy load resistance become equal to each other. Specifically, assuming that the electric current supplied from the voltage Vrefa to all of the PGAs 140 is denoted by Ia, Rdmya=Vrefa/Ia.

Similarly, as for the reference voltages Vrefp and Vrefn of the A/D converter 142, a dummy load resistance 22 (Rdmyp) and a dummy load resistance 24 (Rdmyn) are provided via switches 23 and 25. The resistance values are set in the same manner as for the PGA.

Figure 6:
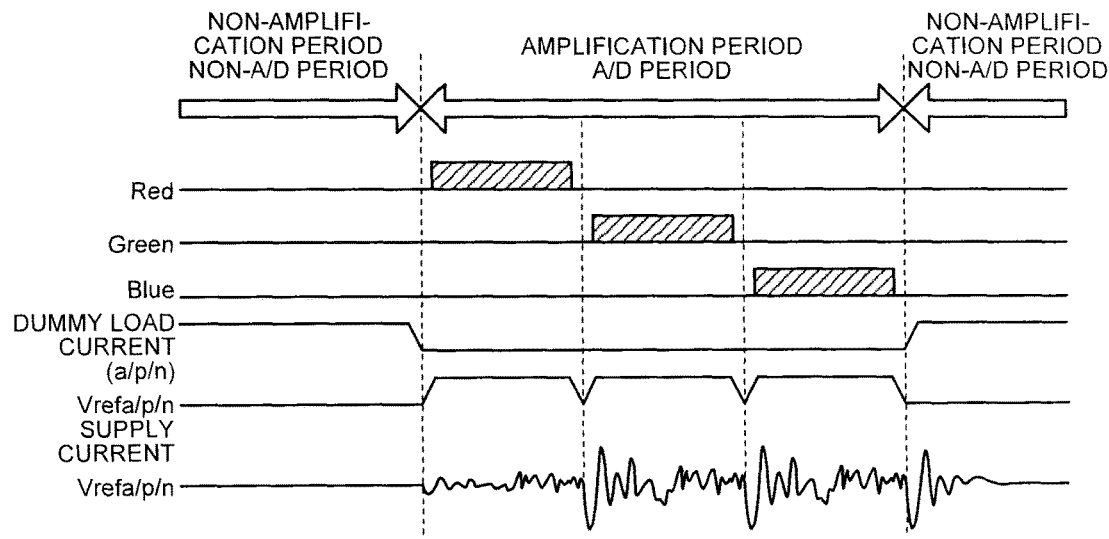
FIG. 6 is a diagram illustrating first operation performed by the photoelectric conversion element of the first modification.

FIG. 6 is a diagram illustrating first operation performed by the photoelectric conversion element 10 of the first modification. In the first operation of the photoelectric conversion element 10 of the first modification, the switch 21 is turned on and the dummy load is connected to the voltage Vrefa to cause a dummy load current to flow during a non-amplification period (a period in which the PGA 140 does not operate). Further, in the photoelectric conversion element 10 of the first modification, the switch 21 is turned off during an amplification period (a period in which the PGA 140 operates).

In the photoelectric conversion element 10 of the first modification, the same applies to the A/D converter 142 such that the switches 23 and 25 are turned on during a non-A/D period (a period in which the A/D converter 142 does not operate) and the switches 23 and 25 are turned off during an A/D period (a period in which the A/D converter 142 operates). As a result, in the first operation of the photoelectric conversion element 10 of the first modification, a current value flowing through Vrefa/p/n becomes constant regardless of whether the PGA 140 and the A/D converter 142 operate or not, so that load fluctuation of Vrefa/p/n is reduced, a characteristic difference between the colors is reduced, and deterioration of the image quality can be prevented. However, in the first operation of the photoelectric conversion element 10 of the first modification, the dummy load current continuously flows, so that power consumption increases, which is an adverse effect. Further, the influence of the switching noise varies between the colors, which is a problem.

Incidentally, in the first operation of the photoelectric conversion element 10 of the first modification, the preliminary operation is operation to cause the dummy load current to flow. Further, in the photoelectric conversion element 10 of the first modification, the dummy load resistances 20, 22, and 24, the switches 21, 23, and 25, and the control unit 16 serve as a signal supply unit that supplies signals needed for the preliminary operation to the analog processing unit, for example. Furthermore, the signals needed for the preliminary operation may be supplied to the photoelectric conversion element 10 of the first modification from outside.

Figure 7:
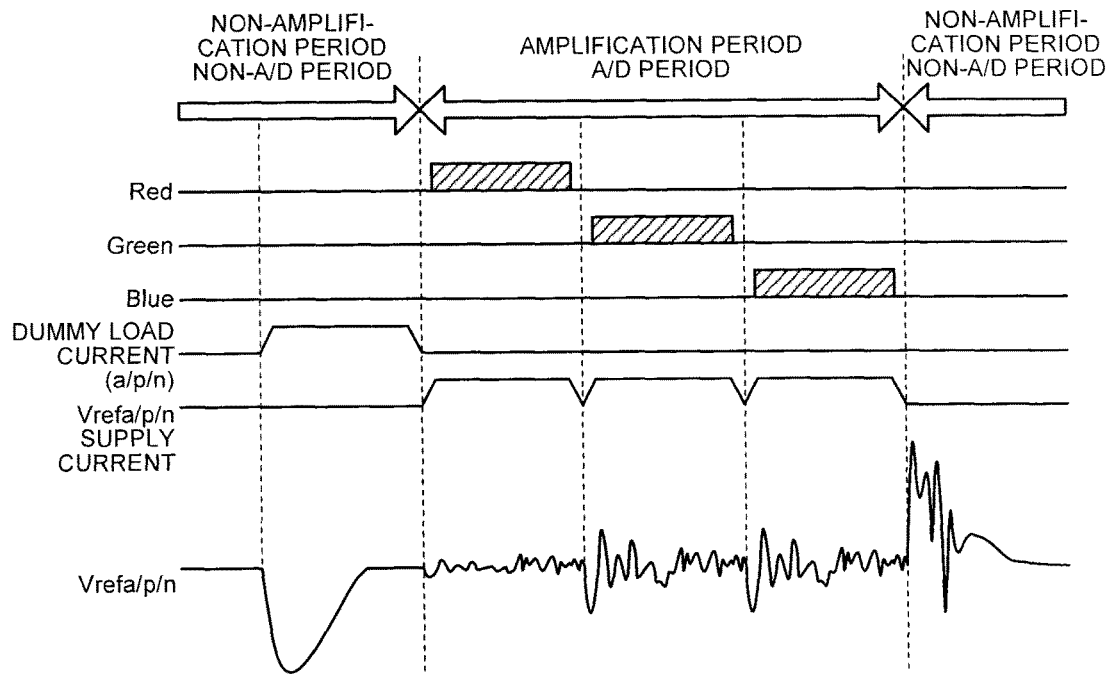
FIG. 7 is a diagram illustrating second operation performed by the photoelectric conversion element of the first modification.

FIG. 7 is a diagram illustrating second operation performed by the photoelectric conversion element 10 of the first modification. In the second operation of the photoelectric conversion element 10 of the first modification, the switch 21 is turned on and the dummy load resistance 20 is connected to the voltage Vrefa to cause a dummy load current to flow for a predetermined period immediately before a red pixel signal is input (immediately before the amplification period starts). The red pixel signal is input to the PGA 140 at a timing at which the switch 21 is turned off. At the moment at which the dummy load current starts to flow, a voltage drop of the voltage Vrefa occurs as load fluctuation, but this does not influence a pixel signal. In this manner, in the second operation of the photoelectric conversion element 10 of the first modification, a load condition immediately before the red pixel signal is input can be approximated to those of the other pixels, so that it is possible to prevent load fluctuation and reduce a characteristic difference between the colors. Further, in the second operation of the photoelectric conversion element 10 of the first modification, it is possible to reduce power consumption as compared to the first operation. However, the influence of the switching noise varies between the colors, which is a problem.

Figure 8:
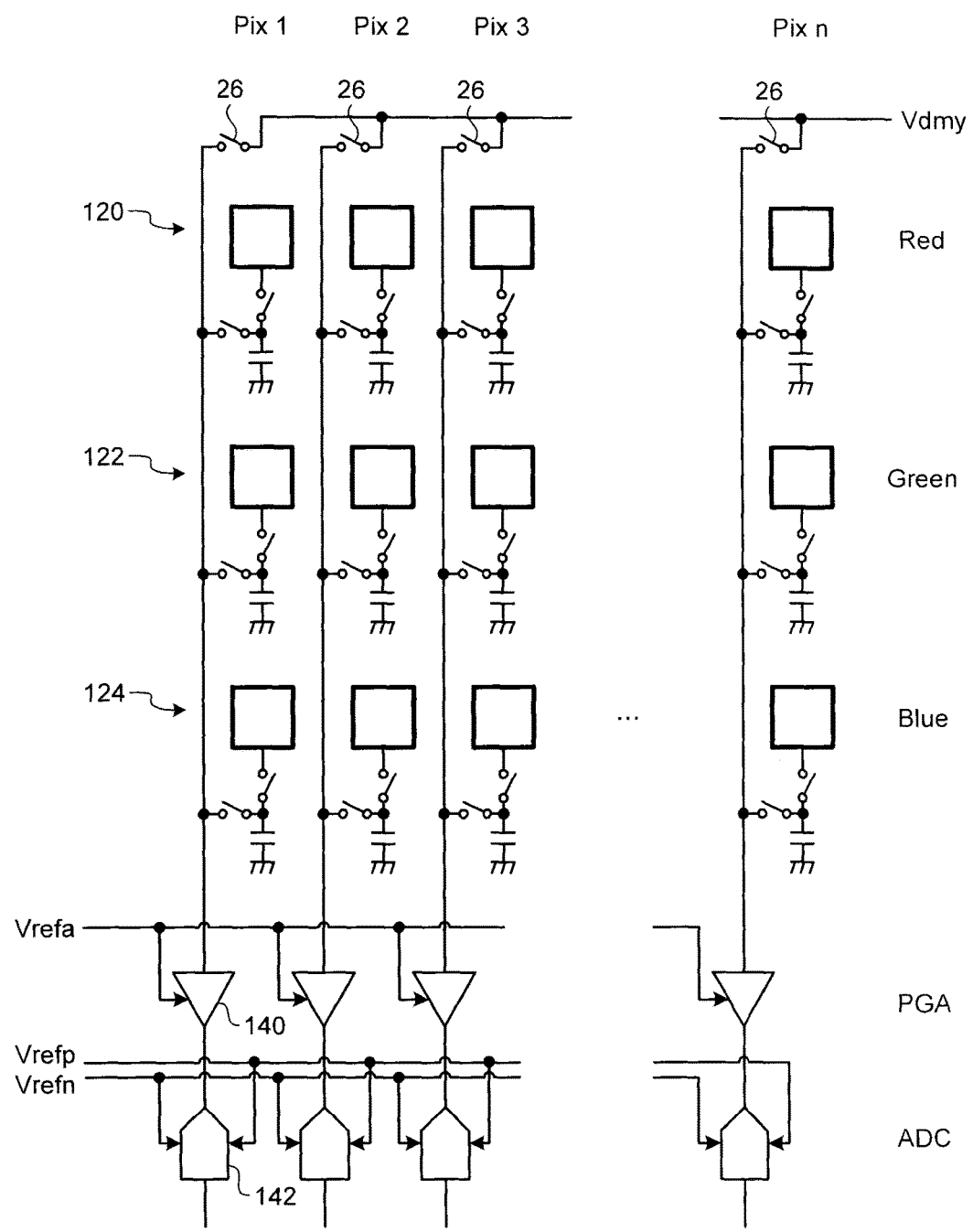
FIG. 8 is a detailed diagram illustrating a photoelectric converter, an analog processing unit, and the periphery of a photoelectric conversion element according to a second modification of the embodiment.

FIG. 8 is a detailed diagram illustrating the photoelectric converter 12, the analog processing unit (the PGA 140 and the A/D converter 142), and the periphery of the photoelectric conversion element 10 according to a second modification. The photoelectric conversion element 10 of the second modification is configured such that a dummy signal (Vdmy) can be input to the single PGA 140, in addition to the analog signals from the pixels of R, G, and B. The dummy signal (Vdmy) is output by the control unit 16, for example. The photoelectric conversion element 10 of the second modification includes switches 26 for switching connection to the PGAs 140 for the respective columns in order to input the dummy signal to the PGAs 140, similarly to the pixels of R, G, and B.

The photoelectric conversion element 10 of the second modification is configured such that a common dummy signal is supplied to all of the columns; however, it may be configured to supply a plurality of dummy signals. It is preferable to input, as the dummy signal, a signal equivalent to a pixel output to the PGA 140; however, a dummy signal within the scope that does not influence the PGA 140 and subsequent processes is satisfactory, and a signal voltage may be variable or constant.

Figure 9:
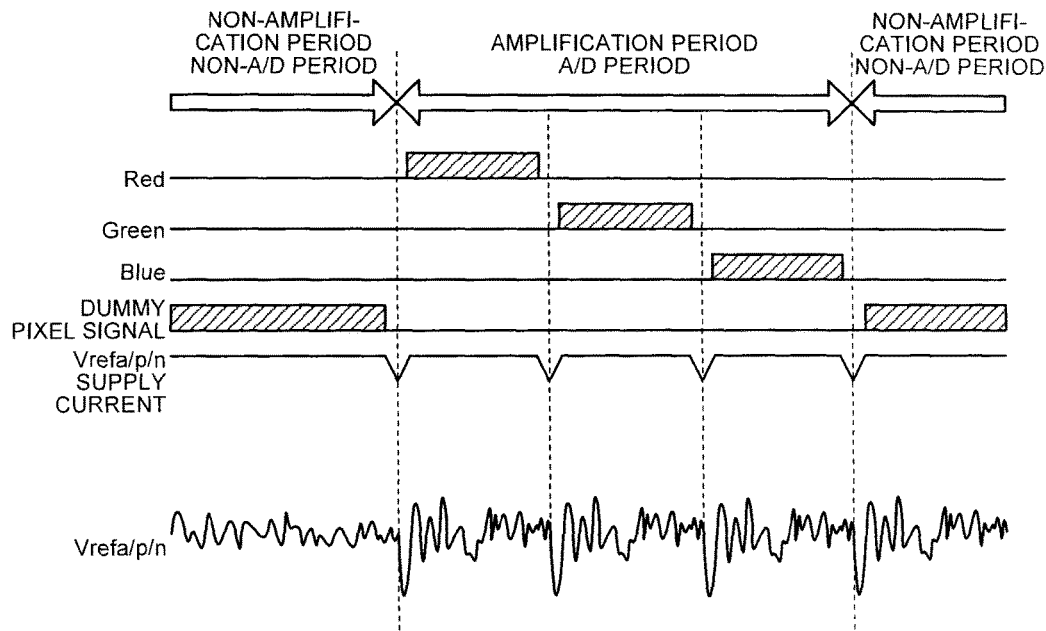
FIG. 9 is a diagram illustrating first operation performed by the photoelectric conversion element of the second modification.

FIG. 9 is a diagram illustrating first operation performed by the photoelectric conversion element 10 of the second modification. In the first operation of the photoelectric conversion element 10 of the second modification, to address the problem in that variation in the voltage Vrefa due to a switching noise differs between the first pixel (red) and the other pixels (green and blue), a dummy pixel signal is continuously input to the PGA 140 and operation (including the switching operation) of the analog processing unit is continuously performed during the non-amplification period and the non-A/D period.

Therefore, in the first operation of the photoelectric conversion element 10 of the second modification, the switching noise continues in the analog processing unit, so that variation in the influence of the switching noise among R, G, and B is eliminated, variation in Vrefa/p/n becomes uniform, and a characteristic difference between the colors is reduced. Further, in the first operation of the photoelectric conversion element 10 of the second modification, as for the variation in Vrefa/p/n due to load fluctuation that occurs when the analog processing unit starts operation, because the analog processing unit continuously performs amplification and A/D operation, the load fluctuation does not occur and a characteristic difference between the colors can be reduced. However, because the analog processing unit continuously performs operation, power consumption increases, which is an adverse effect.

Figure 10:
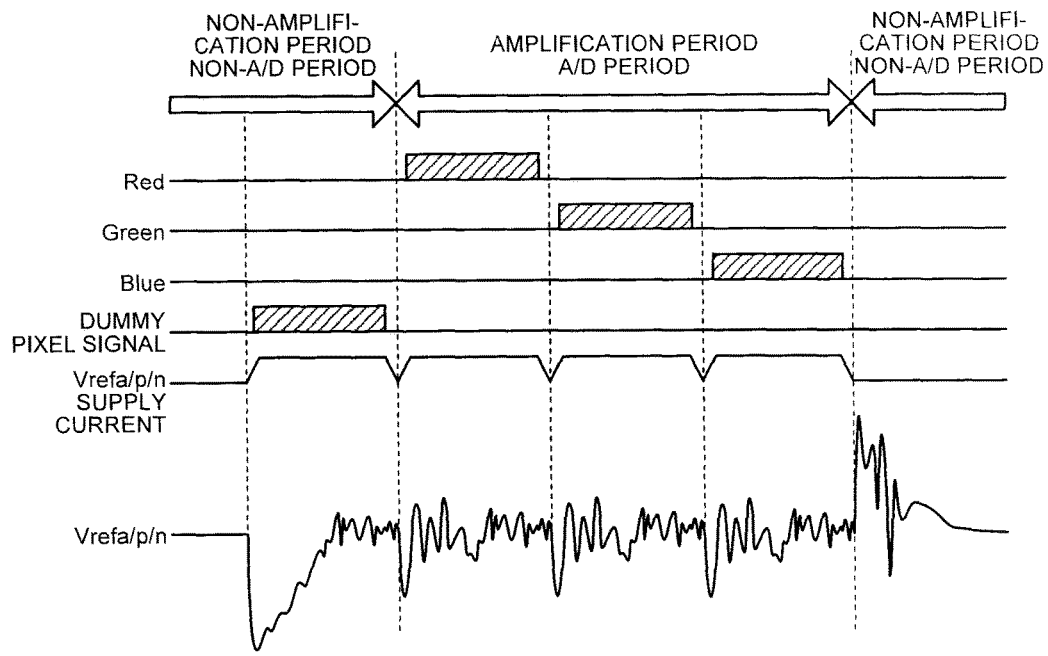
FIG. 10 is a diagram illustrating second operation performed by the photoelectric conversion element of the second modification.

FIG. 10 is a diagram illustrating second operation performed by the photoelectric conversion element 10 of the second modification. In the second operation of the photoelectric conversion element 10 of the second modification, to address the problem in that variation in the voltage Vrefa due to a switching noise differs between the first pixel (red) and the other pixels (green and blue), a dummy pixel signal is input to the PGA 140 and operation of amplification and A/D conversion (including the switching operation) is performed immediately before a red pixel signal is input (immediately before the amplification period starts). Therefore, in the second operation of the photoelectric conversion element 10 of the second modification, the states immediately before the pixel signals are input are the same among R, G, and B with regard to both of the switching noise and the load fluctuation, and the conditions for variation in Vrefa/p/n are the same, so that a characteristic difference between the colors can be reduced. Further, in the second operation of the photoelectric conversion element 10 of the second modification, it is possible to reduce power consumption as compared to the first operation.

Figure 11:
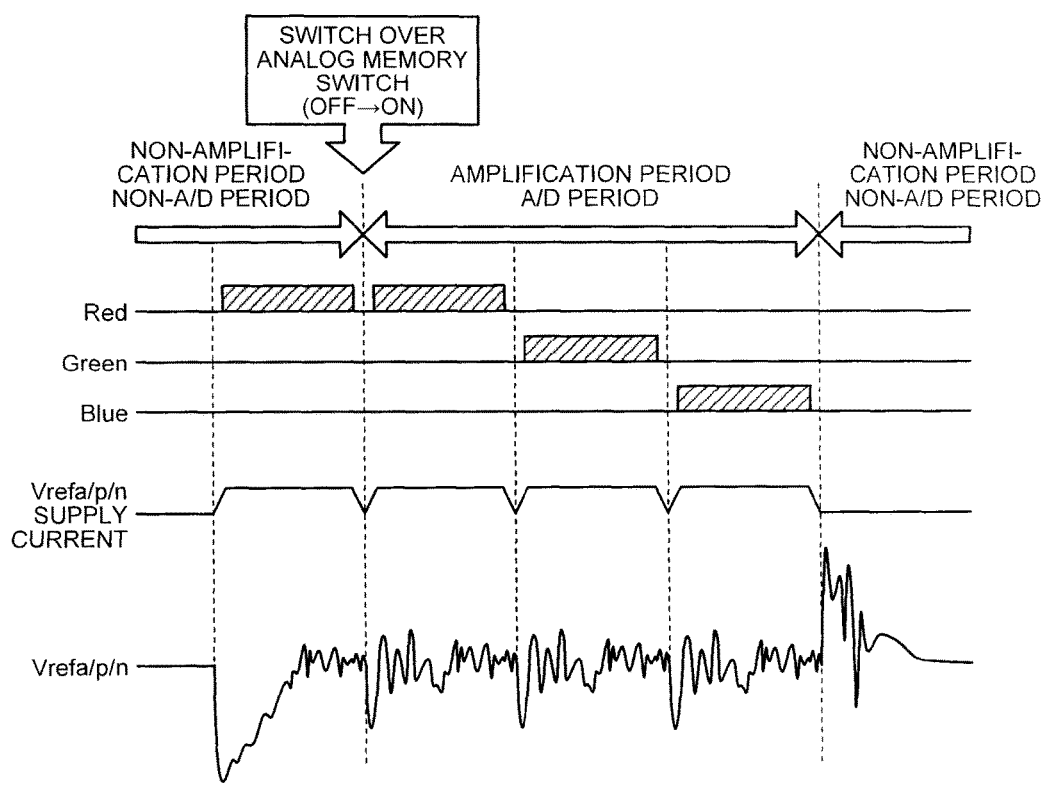
FIG. 11 is a diagram illustrating operation performed by a photoelectric conversion element according to a third modification of the embodiment.

FIG. 11 is a diagram illustrating operation performed by the photoelectric conversion element 10 according to a third modification. The photoelectric conversion element 10 of the third modification is configured such that the analog processing unit processes analog signals (dummy image data) output by n dummy pixels (not illustrated) configured in the same manner as the RGB pixels, before the RGB pixels output analog signals. Specifically, in the photoelectric conversion element 10 of the third modification, the analog processing unit performs amplification and A/D conversion on invalid pixel signals while valid pixel signals are stored in the analog memories of the RGB pixels immediately before the amplification period, and thereafter performs amplification and A/D conversion on the analog signals of the RGB pixels.

In the photoelectric conversion element 10 of the third modification, the preliminary operation is operation to process the dummy image data by the analog processing unit. In this example, mainly the n dummy pixels (not illustrated) and the control unit 16 serve as a signal supply unit that supplies signals needed for the preliminary operation to the analog processing unit, for example.

Incidentally, the dummy image data is not limited to the analog signals output by the dummy pixels, and may be invalid pixel signals before appropriate one pixel (a red pixel in FIG. 11) in a column stores a pixel signal in the analog memory, or may be a substitute signal output by the control unit 16 (a dummy signal corresponding to an analog signal output by a pixel).

Further, the photoelectric conversion element 10 may be configured such that the control unit 16 serves as a signal supply unit that supplies, to the analog processing unit, a control signal to cause the analog processing unit to perform predetermined operation, and the analog processing unit performs the preliminary operation in accordance with the control signal. Namely, even the photoelectric conversion element 10 that is not provided with a dummy pixel (see FIG. 1 for example), it is possible to reduce a characteristic difference between the colors. Further, the above described preliminary operation corresponds to, for example, any of one-pixel processing operation in which the analog processing unit processes an analog signal output by one pixel, a part of the one-pixel processing operation, and operation to perform the one-pixel processing operation in a shorter time than the one-pixel processing operation. Moreover, a part of the one-pixel processing operation includes, for example, at least one of operation at the beginning of the one-pixel processing operation, operation performed until load fluctuation in the one-pixel processing operation is saturated, and operation of switching a switch that is used to switch an operating state. Namely, the photoelectric conversion element 10 may be configured to cause a switching noise in the preliminary operation.

Figure 12:
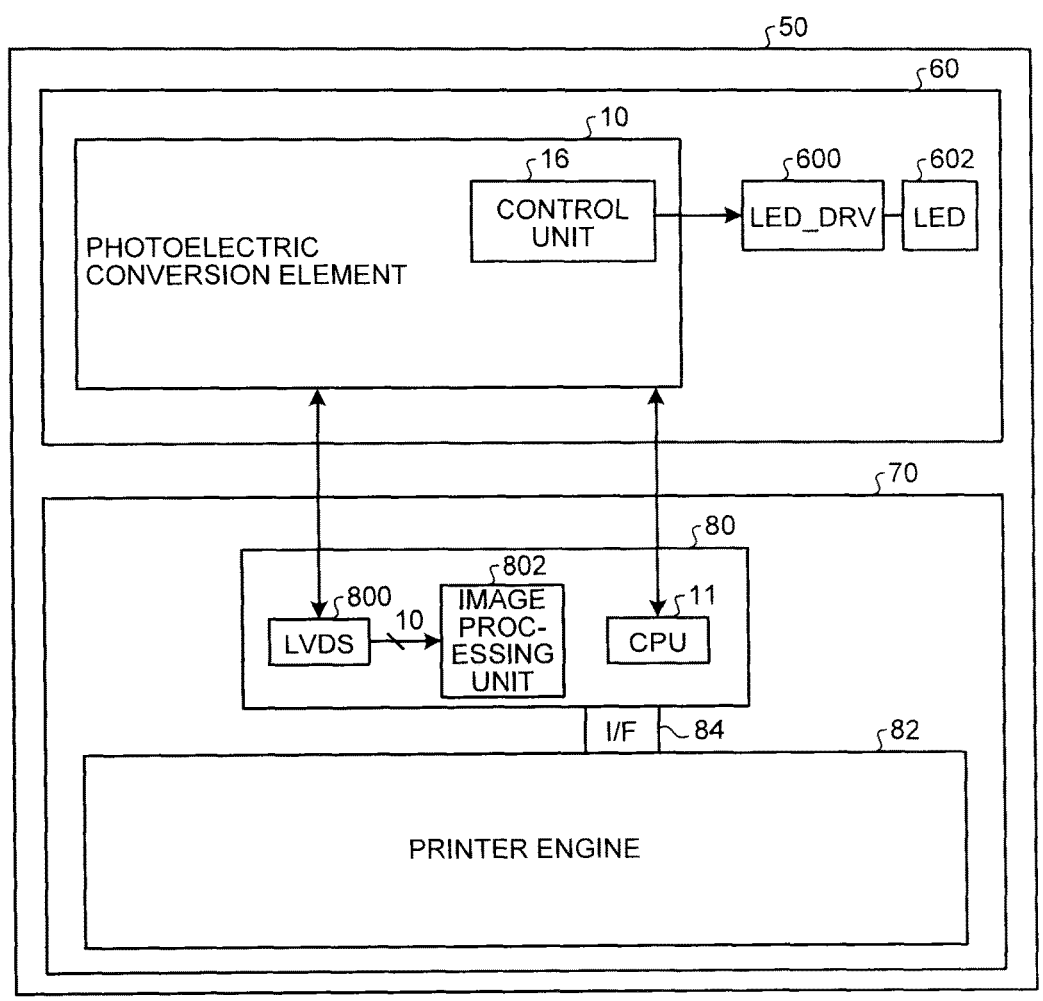
FIG. 12 is a schematic diagram illustrating an image forming apparatus including an image reading device provided with a photoelectric conversion element.

Next, an image reading device and an image forming apparatus including the photoelectric conversion element 10 of the embodiment (or the modifications) will be described. FIG. 12 is a schematic diagram illustrating an image forming apparatus 50 including an image reading device 60 provided with the photoelectric conversion element 10. The image forming apparatus 50 is, for example, a copier or a multifunction peripheral (MFP) that includes the image reading device 60 and an image forming unit 70.

The image reading device 60 includes, for example, the photoelectric conversion element 10, a light emitting diode (LED) driver (LED_DRV) 600, and an LED 602. The LED driver 600 drives the LED 602 in synchronization with a line synchronizing signal output by the control unit 16, for example. The LED 602 emits light to a document. The photoelectric conversion element 10 receives light reflected by the document in synchronization with the line synchronizing signal or the like, and causes a plurality of photodiodes (PD) (not illustrated) to generate electric charges and start to accumulate the electric charges. The photoelectric conversion element 10 performs parallel-to-serial conversion or the like, and thereafter outputs image data to the image forming unit 70.

The image forming unit 70 includes a processing unit 80 and a printer engine 82. The processing unit 80 and the printer engine 82 are connected to each other via an interface (I/F) 84.

The processing unit 80 includes a low-voltage differential signaling (LVDS) 800, an image processing unit 802, and the CPU 11. The CPU 11 executes a program stored in a memory (not illustrated) or the like, and controls each of the units, such as the photoelectric conversion element 10, of the image forming apparatus 50. Further, the CPU 11, the control unit 16, or the like causes each of the PDs to approximately simultaneously generate electric charges in accordance with the amount of light received.

The photoelectric conversion element 10 outputs, to the LVDS 800, image data of an image read by the image reading device 60, a line synchronizing signal, a transfer clock, and the like. The LVDS 800 converts the image data, the line synchronizing signal, the transfer clock, and the like received as above into parallel 10-bit data. The image processing unit 802 performs image processing by using the converted 10-bit data, and outputs image data or the like to the printer engine 82. The printer engine 82 performs printing by using the received image data.

According to the embodiment of the present invention, it is possible to easily prevent deterioration of image quality due to an analog processing unit that sequentially processes analog signals output from a pixel group including a plurality of pixels, without providing a dedicated correction circuit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A photoelectric conversion element comprising:
   a photoelectric conversion circuit that includes a plurality of pixels and is configured to convert electric charges accumulated at each of the pixels to voltage at each of the pixels and output analog signals of the converted voltages;

a plurality of analog processing circuits configured to sequentially process in parallel by each pixel group including the pixels, the output analog signals of the each voltage; and a signal supply circuit configured to supply, to the plurality of analog processing circuits, a signal needed for a preliminary operation so as to enable the plurality of analog processing circuits to perform the preliminary operation immediately before the plurality of analog processing circuits start to process the analog signals output from said each pixel group.

2. The photoelectric conversion element according to claim 1, wherein the signal supply circuit includes a dummy pixel configured in the same manner as each of the pixels, and the analog processing circuits are configured to execute the preliminary operation by processing an analog signal output by the dummy pixel being the signal needed for the preliminary operation.

3. The photoelectric conversion element according to claim 1, wherein the signal supply circuit is configured to supply a dummy signal corresponding to the analog signal output by each of the pixels as the signal needed for the preliminary operation to the analog processing circuits, and the analog processing circuits are configured to execute the preliminary operation by processing.

4. The photoelectric conversion element according to claim 1, wherein the signal supply circuit is configured to supply a control signal as the signal needed for the preliminary operation to the analog processing circuits, and the analog processing circuits are configured to perform the preliminary operation based on the control signal.

5. The photoelectric conversion element according to claim 1, wherein the signal supply circuit includes a dummy load that flows a dummy load current to the analog processing circuits, and the analog processing circuits are configured to perform the preliminary operation by the dummy load current being flowed with the signal supply circuit.

6. The photoelectric conversion element according to claim 1, wherein the analog processing circuits includes at least one of an amplifier that amplifies the analog signals and an analog-to-digital converter that converts the analog signals into digital signals.

7. The photoelectric conversion element according to claim 1, wherein the analog processing circuits are configured to perform the preliminary operation immediately before starting to process the analog signals output from said each pixel group.

8. The photoelectric conversion element according to claim 1, wherein the analog processing circuits are configured to continue the preliminary operation during a period other than a period of processing the analog signals output from said each pixel group.

9. An image reading device comprising the photoelectric conversion element according to claim 1.

10. An image forming apparatus comprising:
the image reading device according to claim 9; and
an image forming unit that forms an image based on image data read by the image reading device.

11. The electronic conversion element according to claim 1, wherein each of the pixels are arranged every each color along a predetermined direction, each of the analog processing circuits sequentially processes each of the output analog signals of each of the voltages converted at every each of the pixels in parallel by every each pixel group of pixels of each color located in each portions along the predetermined direction, the signal supply circuit supplies, to each of the analog processing circuits, the signal needed for the preliminary operation immediately before each of the analog processing circuits starts to process the analog signals that each of the pixel groups outputs.

12. A signal control method comprising:
converting electric charges accumulated at each of a plurality of pixels to voltage at each of the pixels;
supplying, to a plurality of analog processing circuits, a signal needed for preliminary operation; and
after the analog processing circuits performed the preliminary operation, sequentially processing, by the analog processing circuits, in parallel by each pixel group including the pixels, output analog signals of each voltage converted at each of the pixels.

* * * * *